(12) United States Patent
DeHaan

(10) Patent No.: US 8,271,975 B2
(45) Date of Patent: *Sep. 18, 2012

(54) METHOD AND SYSTEM FOR PROVISIONING SOFTWARE

(75) Inventor: Michael DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,998

(22) Filed: Feb. 17, 2012

(65) Prior Publication Data

US 2012/0151470 A1    Jun. 14, 2012

Related U.S. Application Data

(63) Continuation of application No. 11/763,315, filed on Jun. 14, 2007, now Pat. No. 8,185,891.

(60) Provisional application No. 60/917,917, filed on May 14, 2007.

(51) Int. Cl.
*G06F 9/445* (2006.01)

(52) U.S. Cl. ......... 717/177; 717/171; 717/172; 717/176

(58) Field of Classification Search .................. 717/171, 717/172, 176, 177
See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,212,585 B1 | 4/2001 | Chrabaszcz | |
| 6,243,747 B1 | 6/2001 | Lewis et al. | |
| 6,272,536 B1 | 8/2001 | van Hoff et al. | |
| 6,381,742 B2 | 4/2002 | Forbes et al. | |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |
| 6,678,888 B1 * | 1/2004 | Sakanishi | 717/172 |
| 6,686,838 B1 | 2/2004 | Rezvani et al. | |
| 6,691,225 B1 * | 2/2004 | Suffin | 713/2 |
| 6,751,659 B1 | 6/2004 | Fenger et al. | |
| 6,757,837 B1 | 6/2004 | Platt et al. | |

(Continued)

OTHER PUBLICATIONS

Agarwalla "Automating Provisioning of Complete Software Stack in a Grid Environment", 2004.*

(Continued)

*Primary Examiner* — Phillip H Nguyen
(74) *Attorney, Agent, or Firm* — Lowenstein Sandler PC

(57) ABSTRACT

The present invention provides a unified provisioning environment, which comprehensively manages the tasks related to software provisioning. In particular, the present invention manages software provisioning using a hierarchy of commands. The lowest level in the hierarchy comprises distribution commands, which primarily handle base operating system specific tasks of provisioning. The second level comprises profile commands, which associate a configuration file, such as a Linux kickstart file, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

20 Claims, 2 Drawing Sheets

U.S. PATENT DOCUMENTS

| | | |
|---|---|---|
| 6,769,022 B1 | 7/2004 | DeKoning et al. |
| 6,779,004 B1 | 8/2004 | Zintel |
| 6,845,464 B2 | 1/2005 | Gold |
| 6,865,737 B1 | 3/2005 | Lucas et al. |
| 6,941,518 B2 * | 9/2005 | French et al. ................. 715/736 |
| 6,947,939 B2 | 9/2005 | Fujibayashi et al. |
| 6,966,058 B2 | 11/2005 | Earl et al. |
| 6,986,033 B2 | 1/2006 | Miyamoto et al. |
| 7,013,461 B2 | 3/2006 | Hellerstein et al. |
| 7,051,101 B1 | 5/2006 | Dubrovsky et al. |
| 7,058,797 B2 | 6/2006 | Miyamoto et al. |
| 7,107,330 B1 | 9/2006 | Hamilton et al. |
| 7,133,822 B1 | 11/2006 | Jacobson |
| 7,165,109 B2 | 1/2007 | Chiloyan et al. |
| 7,185,071 B2 | 2/2007 | Berg et al. |
| 7,200,845 B2 | 4/2007 | Morrison et al. |
| 7,207,039 B2 | 4/2007 | Komarla et al. |
| 7,213,065 B2 | 5/2007 | Watt |
| 7,330,967 B1 | 2/2008 | Pujare et al. |
| 7,340,637 B2 | 3/2008 | Nagoya |
| 7,350,112 B2 | 3/2008 | Fox et al. |
| 7,356,679 B1 | 4/2008 | Le et al. |
| 7,395,322 B2 | 7/2008 | Harvey et al. |
| 7,506,040 B1 | 3/2009 | Rabe et al. |
| 7,506,151 B2 | 3/2009 | Miyamoto et al. |
| 7,516,218 B2 | 4/2009 | Besson |
| 7,519,691 B2 | 4/2009 | Nichols et al. |
| 7,574,481 B2 | 8/2009 | Moore et al. |
| 7,600,005 B2 | 10/2009 | Jamkhedkar et al. |
| 7,606,868 B1 | 10/2009 | Le et al. |
| 7,640,325 B1 | 12/2009 | DeKoning et al. |
| 7,673,130 B2 | 3/2010 | Miyamoto et al. |
| 7,681,080 B2 | 3/2010 | Abali et al. |
| 7,716,316 B2 | 5/2010 | Nichols et al. |
| 7,734,717 B2 | 6/2010 | Saarimäki et al. |
| 7,827,261 B1 | 11/2010 | Griswold et al. |
| 7,831,692 B2 | 11/2010 | French et al. |
| 7,831,997 B2 | 11/2010 | Eldar et al. |
| 7,937,437 B2 | 5/2011 | Fuji |
| 2002/0062259 A1 | 5/2002 | Katz et al. |
| 2002/0078186 A1 | 6/2002 | Engel et al. |
| 2002/0138567 A1 | 9/2002 | Ogawa |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammad |
| 2003/0126585 A1 | 7/2003 | Parry |
| 2003/0195921 A1 | 10/2003 | Becker et al. |
| 2003/0212992 A1 | 11/2003 | Ronning et al. |
| 2003/0233648 A1 | 12/2003 | Earl et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2005/0028025 A1 | 2/2005 | Zalewski et al. |
| 2005/0050175 A1 | 3/2005 | Fong et al. |
| 2005/0114474 A1 | 5/2005 | Anderson et al. |
| 2005/0125525 A1 | 6/2005 | Zhou et al. |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0041767 A1 | 2/2006 | Maxwell et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0067419 A1 | 3/2007 | Bennett |
| 2007/0101118 A1 | 5/2007 | Raghunath et al. |
| 2007/0118654 A1 | 5/2007 | Jamkhedkar et al. |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294376 A1 | 12/2007 | Ayachitula et al. |
| 2007/0299951 A1 | 12/2007 | Krithivas |
| 2008/0028048 A1 | 1/2008 | Shekar et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0189693 A1 | 8/2008 | Pathak |
| 2008/0196043 A1 | 8/2008 | Feinleib et al. |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0270674 A1 | 10/2008 | Ginzton |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 | 12/2008 | Pathak |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland, IV et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0240835 A1 | 9/2009 | Adelman et al. |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2010/0023740 A1 | 1/2010 | Moon et al. |
| 2010/0100876 A1 | 4/2010 | Glover et al. |
| 2010/0217837 A1 | 8/2010 | Ansari et al. |
| 2010/0217840 A1 | 8/2010 | DeHaan et al. |
| 2010/0217843 A1 | 8/2010 | DeHaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |
| 2010/0220584 A1 | 9/2010 | DeHaan et al. |
| 2010/0223367 A1 | 9/2010 | DeHaan |
| 2010/0223504 A1 | 9/2010 | DeHaan et al. |
| 2010/0223607 A1 | 9/2010 | DeHaan |
| 2010/0223608 A1 | 9/2010 | DeHaan et al. |
| 2010/0223609 A1 | 9/2010 | DeHaan et al. |
| 2010/0223610 A1 | 9/2010 | DeHaan et al. |
| 2010/0250907 A1 | 9/2010 | DeHaan |
| 2010/0306337 A1 | 12/2010 | DeHaan |
| 2010/0306380 A1 | 12/2010 | DeHaan |

OTHER PUBLICATIONS

Agarwalla et al. "Automating Provisioning of Complete Software Stack in a Grid Environment," 2004.
Judit, Novak, "Automatic Installation and Configuration for Large Scale Farms", 2005.
Quintero et al., "Introduction to pSeries Provisioning", 2004.
HP Storage Essentials SRM 6.0 Installation Guide. Jan. 2008. HP. 1st ed. Part No. 74283-96113. pp. 1-5, 97-136, 219-228.
HP Storage Essentials SRM 6.0 User Guide. Jan. 2008. HP. 1st ed. Part No. T4238-96114. pp. 1-83.
DeHaan, Michael. "Unified Provisioning". 2007.
DeHaan, Michael. "Provisioning With Cobbler". 2007.
Tan et al. "A WBEM Basked Disk Array Management Provider". 2005. IEEE. 2005 International Conference on Cyberworlds.
Lovelace et al. Managing Disk Subsystems Using IBM TotalStorage Productivity Ceneter. Sep. 2005. IBM. 2nd ed. SG24-7097-01. pp. 1-42.
Grosse, "Repository Mirroring", 1995.
Anderson et al., "Technologies for Large-Scale Configuration Management", Dec. 9, 2002.
Butt et al., "Automated Installation of Large-Scale Linux Networks", 2000.
eBook "Microsoft System Management Server 2003 Administrator's Companion", Microsoft Press. C2004, Ch. 13, Patch Management, pp. 471-507.
Doc Searls "Linux for Suites", 2005, Specialized System Consultants Inc., vol. 2005.
Maghraoui et al., "Model Driven Provisioning: Bridging the Gap Between Declarative Object Models and Procedural Provisioning Tools", 2006.
USPTO Office Action mailed Oct. 7, 2010 for U.S. Appl. No. 11/763,315.
USPTO Office Action mailed Apr. 20, 2011 for U.S. Appl. No. 11/763,315.
USPTO Notice of Allowance mailed Nov. 2, 2011 for U.S. Appl. No. 11/763,315.
USPTO Office Action mailed Oct. 7, 2010 for U.S. Appl. No. 11/763,333.
USPTO Office Action mailed Apr. 20, 2011 for U.S. Appl. No. 11/763,333.
USPTO Notice of Allowance mailed Oct. 27, 2011 for U.S. Appl. No. 11/763,333.

* cited by examiner

METHOD AND SYSTEM FOR PROVISIONING SOFTWARE

CROSS-REFERENCE TO RELATED APPLICATIONS

This patent application is a continuation of U.S. Non-Provisional application Ser. No. 11/763,315, filed Jun. 14, 2007, which claims the benefit under 35 U.S.C. §119(e) of U.S. Provisional Application No. 60/917,917, filed May 14, 2007, both of which are herein incorporated by reference.

FIELD OF THE INVENTION

The present invention relates to provisioning of software.

BACKGROUND OF THE INVENTION

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

Furthermore, none of the known provisioning control tools provide virtualization installation support unified with other provisioning types on a target machine. Virtualization install support requires knowledge of additional parameters and to date cannot be automated for software rollouts with the current available tools.

Ideally, provisioning control tools would be able to handle the various types of provisioning. For example, many system administrators in data centers utilize Preboot Execution Environment (PXE) installations. However, other forms of provisioning, such as virtualization installations, and re-installations are also common. Accordingly, it would be desirable to provide provisioning control tools that can handle different types of installations.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

The present invention provides a unified provisioning environment, which comprehensively manages the tasks related to software provisioning. In particular, the present invention manages software provisioning using a hierarchy of commands. The lowest level in the hierarchy comprises distribution commands, which primarily handle base operating system specific tasks of provisioning. The second level comprises profile commands, which associate a configuration file, such as a Linux kickstart file, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The unified provisioning environment provides several capabilities and advantages over the known provisioning solutions. For example, the present invention is capable of handling a variety of forms of installations, such as PXE, virtualization, and re-installations.

The present invention enables integrating virtualization into a PXE provisioning infrastructure and provides several options to reinstall running machines as well. The present invention can integrate mirroring of package repositories with the provisioning process, so that a provisioning server may serve as a central mirror point of contract for all of an organization's software needs. In the present invention, mirrored repositories can automatically be used by provisioned systems without additional setup.

Reference will now be made in detail to the exemplary embodiments of the invention. The present invention may be applied to provisioning any form of software, such as Windows systems, UNIX systems, and Linux systems. For purposes of illustration, the present invention will now be explained with reference to implementation to Linux systems, such as Fedora and Red Hat Enterprise Linux by Red Hat, Inc.

Figure 1:
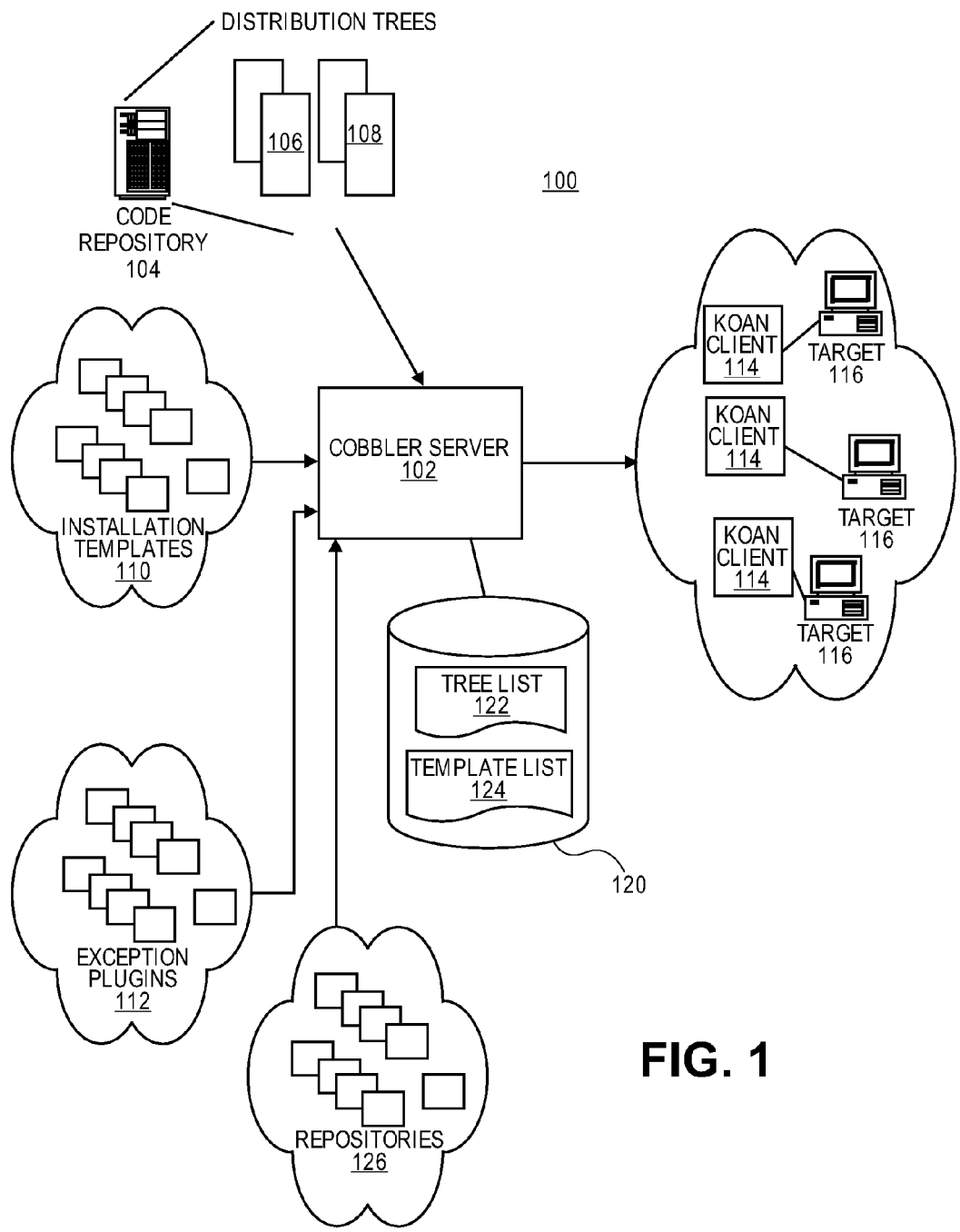
FIG. 1 illustrates an exemplary system in which the present invention may be employed.

Accordingly, the description will first provide some general information about Linux installations. Next, FIG. 1 is presented to explain an exemplary Linux-type system of the present invention. Several examples of the hierarchy of commands will then be explained. Wherever possible, the same reference numbers will be used throughout the drawings to refer to the same or like parts Turning now to the provisioning of Linux systems, many system administrators use what is known as the "kickstart" installation method. Kickstart files are files that specify the intended configuration of the software being provisioned. Kickstart files can be kept on a server and can be read by individual computers during the installation. This installation method allows the use a single or relatively few standard kickstart files to install Linux on multiple machines, making it ideal for network and system administrators.

The kickstart file is a simple text file, containing a list of items, each identified by a keyword. In general, a kickstart file can be edited with any text editor or word processor that can save files as ASCII text. One skilled in the art will recognize that the present invention may be applied to non-kickstart files in Linux provisioning. For example, configuration files such as AutoYAST Answer files used in Novell SuSe Linux and Sun Solaris Jumpstart files may also be used by the present invention.

Typically, a kickstart file is copied to the boot disk, or made available on the network. The network-based approach is most commonly used, as most kickstart installations for Linux systems tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical Linux installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

Referring now to FIG. 1, an exemplary system 100 that is consistent with the present invention is shown. The system 100 may comprise a provisioning server 102, a code repository 104 which provides access to distributions 106 and 108, a set of installation templates 110, a set of exception plugins 112, a helper client 114 running on target machines 116, a scheduler 118, a provisioning database 120 which comprises a distribution tree list 122 and template list 124. Each of these components will now be further described.

Provisioning server (from herein referred to as a "cobbler") 102 is responsible for: serving as a extensible markup language remote procedure call (XMLRPC) handler; linking to or mirroring install distribution trees and a configuration database; hosting kickstart templates; and hosting plugins. Cobbler server 102 may be implemented as software, such as Python code, installed on a boot server machine and provides a command line interface for configuration of the boot server. In addition, cobbler server 102 may make itself available as a Python application programming interface (API) for use by higher level management software (not shown). Cobbler server 102 supports provisioning via PXE, virtualization, and re-provisioning. As will be described later, the last two modes are performed with the assistance of a helper client 114.

Code repository 104 is responsible for hosting distributions 106 and 108. Code repository 104 may be implemented using well known components of hardware and software.

Distributions 106 and 108 are bundles of software that is already compiled and configured. Distributions 106 and 108 may be in the form of either rpm, deb, tgz, msi, exe etc. formats. As Linux distributions, distributions 106 and 108 are bundles of software that comprise the Linux kernel, the non-kernel parts of the operating system, and assorted other software. Distributions 106 and 108 may take a variety of forms, from fully-featured desktop and server operating systems to minimal environments.

Installation templates 110 are any data structure or processing element that can be combined with a set of installation configurations and processed to produce a resulting configuration file, such as a kickstart file.

Exception plugins 112 is software that interacts with cobbler server 102 to customize the provisioning of software. In general, exceptions plugins 112 are intended to address infrequent customization needs.

Helper client (known as "koan", which stands for kickstart-over-a-network") 114 may assist cobbler server 102. Koan 114 allows for both network provisioning of new virtualized guests and destructive provisioning of any existing system. When invoked, koan 114 requests profile information from a remote boot server that has been configured with cobbler server 102. In some embodiments, what koan 114 does with the profile data depends on whether it was invoked with --virt or --replace-self.

In addition, koan 114 enables replacing running systems as well as installing virtualized profiles. Koan 114 may also be pushed out to systems automatically from the boot server. In some embodiments, helper client 114 is also written in Python code to accommodate a variety of operating systems, machine architectures, etc.

Target machines 116 represent the particular machines to which software provisioning is directed. Target machines 116 may represent a wide variety of devices.

Although FIG. 1 shows relatively few number of target machines 116, the present invention is capable of managing a wide range environments, such as datacenters with thousands of machines or server pools with just a few machines.

Provisioning database 120 serves as a data storage location for holding data used by cobbler server 102. For example, as shown, provisioning database 120 will typically comprise distribution tree list 122 and template list 124.

Distribution tree list 122 provides an inventory of distributions 106 and 108 that are hosted or mirrored by cobbler server 102. Template list 124 provides an inventory of templates 110 that are hosted by cobbler server 102.

Now that an exemplary system for the present invention has been described, some of the commands and provisioning processes supported by the present invention will now be described. As noted above, cobbler server 102 manages provisioning using a hierarchical concept of distribution commands, profile commands, system commands, and repository commands. This framework enables cobbler server 102 to abstract the differences between multiple provisioning types (installation, reinstallation, and virtualization) and allows installation of all three from a common platform. This hierarchy of commands also permits cobbler server 102 to integrate software repositories with the provisioning process, thus allowing systems to be configured as a mirror for software updates and third party content as well as distribution content. The present disclosure will now explain the hierarchy of commands further.

Distributions contain information about base operating system tasks, such as what kernel and initrd are used in the provisioning, along with other information, such as required kernel parameters. Profiles associate one of distributions 106 and 108 with a kickstart file and optionally customize it further, for example, using plugins 112. Systems commands associate a hostname, IP, or MAC with a distribution and optionally customize the profile further. Repositories contain update information, such as yum mirror information that cobbler server 102 uses to mirror repository 104. Cobbler server 102 can also manage (generate) DHCP configuration files using templates 110.

Of note, cobbler server 102 uses a provisioning environment that is fully templated, allowing for kickstarts and PXE files to be customized by the user. Cobbler server 102 uses the concept of "profiles" as an intermediate step between the operating system and the installed system. A profile is a description of what a system does rather than what it is installed with. For instance, a profile might describe a virtual web server with X amount of RAM, Y amounts of disk space, running a Linux distribution Z, and with an answer file W.

Cobbler server 102 provides a command line interface to configure a boot server in which it is installed. The format of the cobbler server 102 commands is generally in the format of: cobbler command [subcommand] [--arg1=] [--arg2=]. An exemplary process flow will now be described in which a user may provision software via this command line interface.

Figure 2:
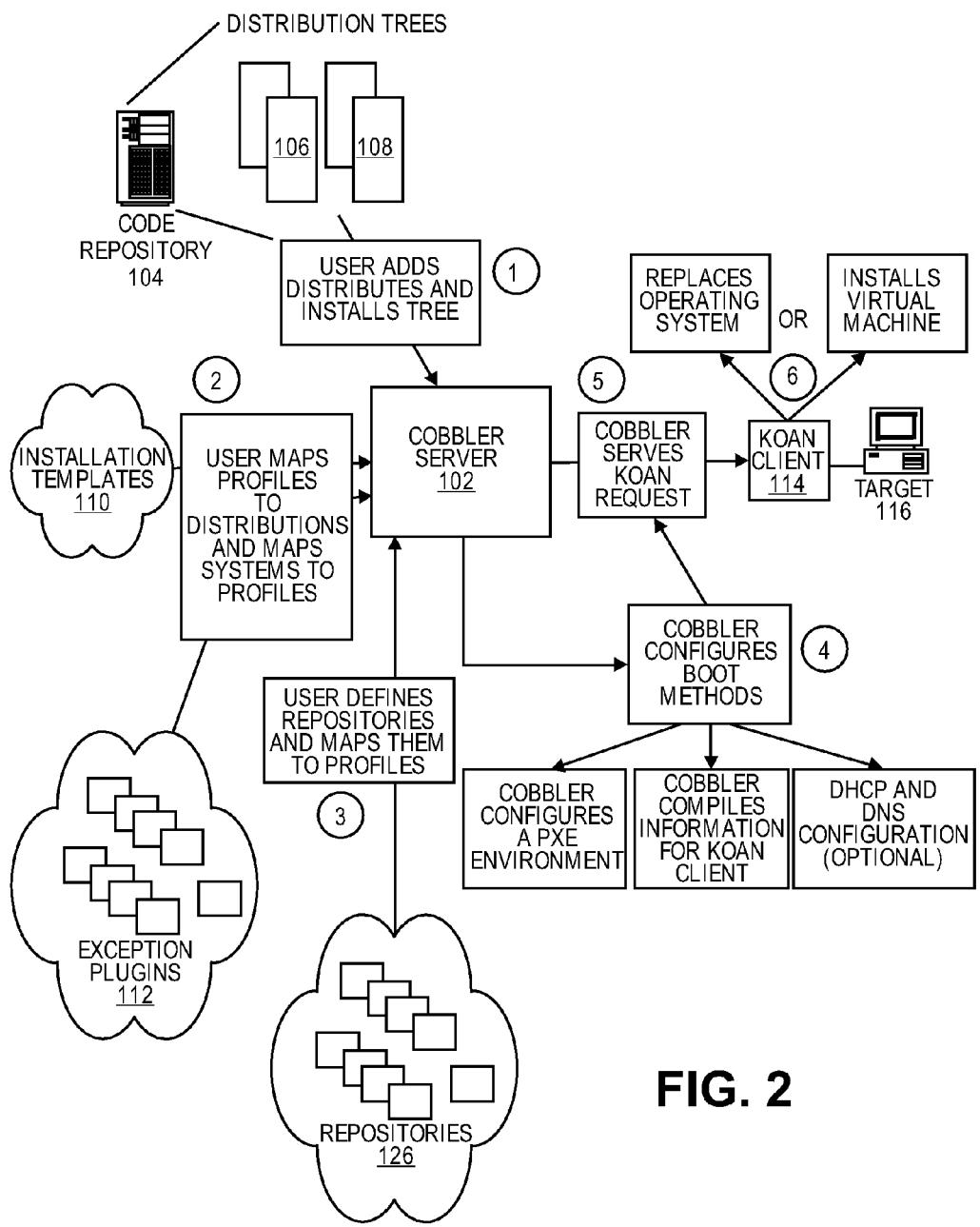
FIG. 2 illustrates an exemplary process flow of the present invention.

FIG. 2 illustrates an exemplary process flow of the present invention. As noted, cobbler server 102 provides a unified provisioning environment. Thus, a user may specify various aspects of software provisioning via a single interface, such as a command line interface or other known interface. Some of the phases of specifying software provisioning in a unified environment will now be explained with reference to FIG. 2.

In phase 1, a user may use various commands of the present invention to specify distributions and install trees hosted by code repository 104, such as a distribution from distributions 106 or 108. A user may add or import a distribution or import it from installation media or an external network location.

In some embodiments, the user may use a manual add command generally of the form: cobbler distro add --name=string --kernel=path --initrd=path [--kopts=string] [--ksmeta=string] [--arch=x86|x86_64|ia64] [--breed=redhat|suse], where "Name" is a string identifying the distribution, such as "rhel4".

"Kernel" is an absolute filesystem path to a kernel image

"Initrd" is an absolute filesystem path to a initrd image

"Kopts" is an optional parameter that sets kernel command-line arguments that the distro, and profiles/systems dependent on it will use. For example, --kopts="foo=bar baz=3 asdf" is an example of a kopts parameter.

"Arch" is an optional parameter that sets the architecture for the PXE bootloader.

"Ksmeta" is an optional parameter that sets kickstart variables to substitute, thus enabling kickstart files to be treated as templates. For example, --ksmeta="foo=bar baz=3 asdf" is example of a ksmeta parameter. Templating is further described below.

"Breed" specifies a general type of the Linux system distribution, such as Red Hat or Novell SuSE. In some embodiments, the default for breed is "redhat", which may be a suitable value for Fedora and Centos as well. Specifying "suse" allows the kickstart file parameters to be treated instead like AutoYaST answer files, such that the proper parameters for SuSE answer files are put on the kernel command line. Support for other types of distributions is also possible. The file used for the answer file, regardless of distro breed, is the value used for --kickstart when creating the profile.

In order to import a distribution, cobbler server 102 can auto-add distributions and profiles from remote sources, whether this is an installation media (such as a DVD), an NFS path, or an rsync mirror. When importing a rsync mirror, cobbler server 102 will try to detect the distribution type and automatically assign kickstarts. By default in some embodiments, it will provision by erasing the hard drive, setting up eth0 for DHCP, and using a default password. If this is undesirable, an administrator may edit the kickstart files in /etc/cobbler to do something else or change the kickstart setting after cobbler server 102 creates the profile.

In phase 2, a user may map profiles to the distributions and map systems to the profiles using profile commands and systems commands of the present invention. As noted above, a profile associates a distribution to additional specialized options, such as a kickstart automation file. In cobbler server 102, profiles are the unit of provisioning and at least one profile exists for every distribution to be provisioned. A profile might represent, for instance, a web server or desktop configuration.

In general, the command for adding a profile may be of the form: cobbler profile add --name=string --distro=string [--kickstart=url] [--kopts=string] [--ksmeta=string] [--virt-file-size=gigabytes] [--virt-ram=megabytes], where:

"Name" is a descriptive name, such as "rhel4webservers" or "fc6desktops".

"Distro" is the name of a previously defined cobbler distribution

"Kickstart" is the local filesystem path to a kickstart file. If this parameter is not provided, the kickstart file will default to /etc/cobbler/default.ks (or whatever is set in /var/lib/cobbler/settings). If this file is initially blank, default kickstarts are not automated. However, an administrator can change the default.ks for an automated installation.

"Virt-file-size" is an optional parameter that sets how large the disk image should be in gigabytes.

"Virt-ram" is an optional parameter that sets how many megabytes of RAM to consume.

"Repos" is an optional parameter that sets a space delimited list of all the repos (created with the "cobbler repo add" and "cobbler reposync" commands) that this profile can make use of during kickstart installation. For example, --repos="fc6i386updates fc6i386extras" is one example of a repos parameter.

Next, a user may map systems to profiles using system commands of the present invention. In general, systems commands assign a piece of hardware with cobbler server 102 to a profile. Systems can be defined by hostname, Internet Protocol (IP) address, or MAC address. When available, use of the MAC address to assign systems may be preferred.

The general format for specifying Systems commands to cobbler server 102 may be of the form: cobbler system add --name=ip|mac|hostname --profile=string [--kopts=string] [--pxe-address=string] [--ksmeta=string], where:

"Name" is the name that is either a currently-resolvable hostname, an IP address, or a MAC address. When defining Virtualized systems, using a MAC address causes the Virt MAC address to be used for creation. In some embodiments, the name may be "default". In this situation, the PXE will use the specific profile set for "unconfigured" systems, otherwise it will fall through to local boot.

"Pxe-address" is a feature that may be used to generate the dhcpd.conf file. This setting sets a certain hostname or IP to a given MAC address. This corresponds to the "fixed-address" field in dhcpd.conf.

In phase 3, the user may map repositories and profiles using repository commands of the present invention. In general, repository commands address configurations and tasks related to updating the software, remote installation procedures, and optionally customizing the software. These repository commands may also specify mirroring of the provisioned software. Repository mirroring allows cobbler server 102 to mirror not only install trees 106 and 108, but also optional packages, third party content, and updates. Mirroring may be useful for faster, more up-to-date installations and faster updates, or providing software on restricted networks.

The command for specifying a Repository is generally of the form: cobbler repo add --mirror=url --name=string [--local-filename=string], where:

"Mirror" is the address of the yum mirror. This can be an rsync:// URL, an ssh location, or a http:// or ftp:// mirror location. For example, rsync://yourmirror.example.com/fedora-linux-core/updates/6/i386 (for rsync protocol) http://mirrors.kernel.org/fedora/extras/6/i386/(for http://) user@yourmirror.example.com/fedora-linux-core/updates/6/i386 (for SSH).

"Name" is the save location for the mirror. This name corresponds with values given to the --repos parameter of "cobbler profile add". If a profile has a --repos value that matches the name here, that repo can be automatically set up during provisioning. This means that, if supported, the repo can be used during kickstart install -- and -- either way, it can be automatically configured on the clients.

"Local filename" specifies, for kickstarts containing the template parameter "yum_config_stanza", what files to populate on provisioned clients in /etc/yum.repos.d. In other words, if this value is "foo", the repo would be installed on provisioned clients as "/etc/yum.repos.d/foo.repo".

Cobbler server 102 may also include other administrative features, such as allowing the user to view their provisioning configuration or information tracking the status of a requested software installation. For example, the "cobbler sync" can be used to repair or rebuild the contents /tftpboot or /var/www/cobbler when something has changed. The command brings the filesystem up to date with the configuration as understood by cobbler server 102. The cobbler sync function may be run whenever files in /var/www/cobbler are manually edited or when making changes to kickstart files.

The following example shows a sequence of commands to create a provisioning infrastructure from a distribution mirror. Then a default PXE configuration is created, so that by default systems will PXE boot into a fully automated install process for that distribution. A network rsync mirror or a mounted DVD location. Accordingly, the sequence of commands may be:

```
cobbler check
cobbler import --mirror=rsync://yourfavoritemirror.com/foo --mirror-name=anyname
# OR
cobbler import --mirror=root@localhost:/mnt/dvd --mirror-name=anyname
# wait for mirror to rsync . . . .
cobbler report
cobbler system add --name=default --profile=name_of_a_profile1
cobbler system add --name=AA:BB:CC:DD:EE:FF --profile=name_of_a_profile2
cobbler sync
```

In this next example, the administrator uses a local kernel and initrd file (already downloaded), and shows how profiles would be created using two different kickstarts --one for a web server configuration and one for a database server. Then, a machine is assigned to each profile. Accordingly, the sequence of commands may be:

```
cobbler check
cobbler distro add --name=rhel4u3--kernel=/dir1/vmlinuz --initrd=/dir1/initrd.img
cobbler distro add --name=fc5--kernel=/dir2/vmlinuz --initrd=/dir2/initrd.img
cobbler profile add --name=fc5webservers --distro=fc5-i386--kickstart=/dir4/kick.ks --kopts="something_to_make_my_gfx_card_work=42, some other_parameter=foo"
cobbler profile add --name=rhel4u3 dbservers --distro=rhel4u3--kickstart=/dir5/kick.ks
cobbler system add --name=AA:BB:CC:DD:EE:FF --profile=fc5-webservers
cobbler system add --name=AA:BB:CC:DD:EE:FE --profile=rhel4u3-dbservers
cobbler report
```

The following example shows how to set up a repo mirror for two repositories, and create a profile that will auto install those repository configurations on provisioned systems using that profile. Accordingly, the sequence of commands would be:

```
cobbler check
# set up cobbler distros here.
cobbler repo add --mirror=http://mirrors.kernel.org/fedora/core/updates/6/i386/ --name=fc6i386updates
cobbler repo add --mirror=http://mirrors.kernel.org/fedora/extras/6/i386/ --name=fc6i386extras
cobbler reposync
cobbler profile add --name=p1--distro=existing_distro_name --kickstart=/etc/cobbler/kickstart_fc6.ks --repos="fc6i386updates fc6i386extras"
```

In addition to normal provisioning, cobbler server 102 may support yet another option, called "enchant". Enchant takes a configuration that has already been defined and applies it to a remote system that might not have the remote helper program installed. Users might want to use this command to replace a server that is being repurposed, or when no PXE environment can be created. Thus, the enchant option allows the remote helper client 114 to be executed remotely from cobbler server 102.

If cobbler server 102 is configured to mirror certain repositories, it can then be used to associate profiles with those repositories. Systems installed under those profiles will be auto configured to use these repository mirrors in /etc/yum.repos.d, and if supported these repositories can be leveraged. This can be useful for a large install base, fast installation and upgrades for systems are desired, or software not in a standard repository exists and provisioned systems are desired to know about that repository.

Cobbler server 102 may also keep track of the status of kickstarting machines. For example, the "cobbler status" will show when cobbler server 102 thinks a machine started kickstarting and when it last requested a file. This may be a desirable way to track machines that may have gone inactive during kickstarts. Cobbler server 102 may also make a special request in the post section of the kickstart to signal when a machine is finished kickstarting.

For --virt, cobbler server 102 will create new virtualized guests on a machine in accordance to the orders from cobbler server 102. Once finished, an administrator may use "virsh" and "xm" commands on the guest or other operations. Cobbler server 102 automatically names domains based on their MAC addresses. For re-kickstarting ('--replace-self'), cobbler server 102 will reprovision the system, deleting any current data and replacing it with the results of a network install.

Referring now back to FIG. 2, in phase 4, cobbler server 102 configures boot methods for the provisioning requested by the user. For example, cobbler server 102 may configure a PXE environment, such as a network card BIOS. Alternatively, cobbler server 102 may compile and configure information for koan client 104. Cobbler server 102 may also optionally configured DHCP and DNS configuration information.

In phase 5, cobbler server 102 serves the request of koan client 114. Koan client 114 may acknowledge the service of information of cobbler server 102 and then may initiate installation of the software being provisioned. Processing now flows to phase 6, in which koan client 114 may either install the requested software, e.g., replace the existing operating system, or install a virtual machine.

Other embodiments of the invention will be apparent to those skilled in the art from consideration of the specification and practice of the invention disclosed herein. For example, the cobbler may contain a templating feature that allows a single kickstart file to be customized on a per-system basis. It is intended that the specification and examples be considered as exemplary only, with a true scope and spirit of the invention being indicated by the following claims.

Other embodiments of the invention will be apparent to those skilled in the art from consideration of the specification and practice of the invention disclosed herein. For example, the cobbler may contain a templating feature that allows a single kickstart file to be customized on a per-system basis. It is intended that the specification and examples be considered as exemplary only, with a true scope and spirit of the invention being indicated by the following claims.

What is claimed is:
1. A method comprising:
retrieving, by a provisioning server hosted by a boot server machine, at least one software distribution;
identifying, by the provisioning server, one or more resources associated with a target machine;

determining, by the provisioning server, a function to be performed by the target machine based on the identified one or more resources associated with the target machine;

generating, by the provisioning server, a profile for the at least one software distribution, wherein the profile associates the at least one software distribution with the function to be performed by target machines utilizing the at least one software distribution and wherein the profile links a configuration file to the at least one software distribution;

receiving, by the provisioning server, update information for the at least one software distribution; and automatically installing, by the provisioning server, the at least one software distribution and the update information on the target machine based on the profile.

2. The method of claim 1, wherein retrieving the at least one software distribution comprises at least one of retrieving a Linux distribution, retrieving a distribution having a specified kernel, retrieving a distribution having a specified initrd, specifying parameters in the configuration file that are to be substituted, or retrieving a parameter that sets an architecture for a preboot execution environment (PXE) bootloader that will be used in installation of the at least one software distribution.

3. The method of claim 1, wherein the profile specifies at least one of a virtualization disk image size or an amount of random access memory (RAM) that may be consumed on the target machine.

4. The method of claim 1, further comprising:
receiving information indicating a system remote from the target machine that will assist in installing the at least one software distribution on the target machine; and
installing the at least one software distribution and update information on the target machine with the assistance of the remote system.

5. The method of claim 1, further comprising:
determining when the target machine last requested a file; and
determining a status of installing the at least one software distribution based on when the target machine last requested the file.

6. The method of claim 1, further comprising:
generating the configuration file based on identifying one or more installation templates to use for provisioning the software to the target machine and combining the one or more installation templates with a set of installation configurations.

7. The method of claim 1, further comprising:
customizing the provisioning of the software based on one or more plugins.

8. A system comprising:
a boot server machine, connected to at least one repository of software distributions, that hosts a provisioning server, wherein the provisioning server is configured to:
retrieve at least one software distribution;
identify one or more resources associated with a target machine;
determine a function to be performed by the target machine based on the identified one or more resources associated with the target machine;
generate a profile for the at least one software distribution, wherein the profile associates the at least one software distribution with the function to be performed by target machines utilizing the at least one software distribution and wherein the profile links a configuration file to the at least one software distribution;

receive update information for the at least one software distribution; and
install, automatically, the at least one software distribution and the update information on the target machine based on the profile.

9. The system of claim 8, wherein retrieving the at least one software distribution comprises at least one of retrieving a Linux distribution, retrieving a distribution having a specified kernel, retrieving a distribution having a specified initrd, specifying parameters in the configuration file that are to be substituted, or retrieving a parameter that sets an architecture for a preboot execution environment (PXE) bootloader that will be used in installation of the at least one software distribution.

10. The system of claim 8, wherein the profile specifies at least one of a virtualization disk image size or an amount of random access memory (RAM) that may be consumed on the target machine.

11. The system of claim 8, wherein the provisioning server is further configured to:
receive information indicating a system remote from the target machine that will assist in installing the at least one software distribution on the target machine; and
install the at least one software distribution and update information on the target machine with the assistance of the remote system.

12. The system of claim 8, wherein the provisioning server is further configured to:
determine when the target machine last requested a file; and
determine a status of installing the at least one software distribution based on when the target machine last requested the file.

13. The system of claim 8, wherein the provisioning server is further configured to:
generate the configuration file based on identifying one or more installation templates to use for provisioning the software to the target machine and combining the one or more installation templates with a set of installation configurations.

14. A non-transitory computer readable medium comprising instructions that, when executed by a boot server machine, cause the boot server machine to perform a method comprising:
retrieving, by the boot server machine, at least one software distribution;
identifying, by the boot server machine, one or more resources associated with a target machine;
determining, by the boot server machine, a function to be performed by the target machine based on the identified one or more resources associated with the target machine;
generating, by the boot server machine, a profile for the at least one software distribution, wherein the profile associates the at least one software distribution with the function to be performed by target machines utilizing the at least one software distribution and wherein the profile links a configuration file to the at least one software distribution;
receiving update information for the at least one software distribution; and
automatically installing the at least one software distribution and the update information on the target machine based on the profile.

15. The non-transitory computer readable medium of claim 14, wherein retrieving the at least one software distribution comprises at least one of retrieving a Linux distribution, retrieving a distribution having a specified kernel, retrieving a distribution having a specified initrd, specifying parameters in the configuration file that are to be substituted, or retrieving a parameter that sets an architecture for a preboot execution environment (PXE) bootloader that will be used in installation of the at least one software distribution.

16. The non-transitory computer readable medium of claim 14, wherein the profile specifies at least one of a virtualization disk image size in to the configuration file or an amount of random access memory (RAM) that may be consumed on the target machine.

17. The non-transitory computer readable medium of claim 14, the method further comprising:
- receiving information indicating a system remote from the target machine that will assist in installing the at least one software distribution on the target machine; and
- installing the at least one software distribution and update information on the target machine with the assistance of the remote system.

18. The non-transitory computer readable medium of claim 14, the method further comprising:
- determining when the target machine last requested a file; and
- determining a status of installing the at least one software distribution based on when the target machine last requested the file.

19. The non-transitory computer readable medium of claim 14, the method further comprising:
- generating the configuration file based on identifying one or more installation templates to use for provisioning the software to the target machine and combining the one or more installation templates with a set of installation configurations.

20. The non-transitory computer readable medium of claim 14, the method further comprising:
- customizing the provisioning of the software based on one or more plugins.

* * * * *